(12) United States Patent
  Jauhal

(10) Patent No.: US 10,353,783 B1
(45) Date of Patent: *Jul. 16, 2019

(54) PLUGGABLE RECOVERY IN A DATA PROTECTION SYSTEM

(71) Applicant: EMC IP Holding Company LLC, Hopkinton, MA (US)

(72) Inventor: Shern S. Jauhal, Palo Alto, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 600 days.

This patent is subject to a terminal disclaimer.

(21) Appl. No.: 13/927,400

(22) Filed: Jun. 26, 2013

(51) Int. Cl.
  *G06F 16/00* (2019.01)
  *G06F 11/14* (2006.01)

(52) U.S. Cl.
  CPC ................. *G06F 11/1469* (2013.01)

(58) Field of Classification Search
  CPC .................................................. G06F 11/1469
  See application file for complete search history.

(56) References Cited

U.S. PATENT DOCUMENTS

| | | |
|---|---|---|
| 6,704,886 B1 | 3/2004 | Gill et al. |
| 7,330,997 B1 | 2/2008 | Odom |
| 7,360,110 B1 | 4/2008 | Schmokel et al. |
| 7,523,097 B1 | 4/2009 | Wilson |
| 7,653,714 B2 | 1/2010 | Yagishita |
| 8,151,140 B2 | 4/2012 | Sim-Tang |
| 8,161,321 B2 | 4/2012 | Zheng |
| 8,260,747 B2 | 9/2012 | Wu et al. |
| 8,316,237 B1 | 11/2012 | Felsher |
| 8,365,017 B2 | 1/2013 | Sim-Tang |
| 8,375,248 B2 | 2/2013 | Sim-Tang |
| 1,392,743 A1 | 6/2013 | Jauhal |
| 1,392,746 A1 | 6/2013 | Jauhal |
| 1,393,000 A1 | 6/2013 | Jauhal et al. |
| 1,393,027 A1 | 6/2013 | Jauhal |
| 1,393,160 A1 | 6/2013 | Jauhal |
| 8,464,101 B1 | 6/2013 | Natanzon |
| 8,635,189 B1 * | 1/2014 | Tenzer ............... G06F 11/1469 707/639 |
| 9,201,887 B1 * | 12/2015 | Earl .................. G06F 17/30088 |
| 9,641,486 B1 | 5/2017 | Jauhal et al. |
| 9,703,618 B1 | 7/2017 | Jauhal |

(Continued)

FOREIGN PATENT DOCUMENTS

WO WO 2014/062191 4/2014

OTHER PUBLICATIONS

Ahmad et al., "Survey on secure live virtual machine (VM) migration in Cloud," 2013 2nd National Conference on Information Assurance (NCIA) Year: 2013 pp. 101-106.

(Continued)

*Primary Examiner* — Sherief Badawi
*Assistant Examiner* — Lahcen Ennaji
(74) *Attorney, Agent, or Firm* — Workman Nydegger

(57) ABSTRACT

Systems and methods for performing a recovery operation for a host. A user interface is provided than enables user interface interactions that are common to or independent of the host and user interface interactions that are specific to a client backup module selected for the recovery operation. The user interface retrieves a plug-in to enable the user interface interactions that are specific to the client backup module.

20 Claims, 6 Drawing Sheets

(56) References Cited

U.S. PATENT DOCUMENTS

| | | |
|---|---|---|
| 9,904,606 B1 | 2/2018 | Jauhal |
| 2003/0167408 A1 | 9/2003 | Fitzpatrick et al. |
| 2004/0015578 A1 | 1/2004 | Karakashian et al. |
| 2004/0117548 A1* | 6/2004 | Zamer ................ G06F 3/0614 |
| | | 711/114 |
| 2005/0022176 A1 | 1/2005 | Ramachandran et al. |
| 2005/0149577 A1 | 7/2005 | Okada et al. |
| 2005/0216788 A1 | 9/2005 | Mani-Meitav et al. |
| 2006/0010107 A1* | 1/2006 | Nguyen ............... G06F 11/1458 |
| 2006/0059253 A1* | 3/2006 | Goodman ............. G06Q 10/10 |
| | | 709/223 |
| 2006/0242626 A1* | 10/2006 | Pham ................ G06F 9/44505 |
| | | 717/121 |
| 2007/0168656 A1 | 7/2007 | Paganetti et al. |
| 2007/0185922 A1 | 8/2007 | Kapoor et al. |
| 2007/0271314 A1* | 11/2007 | Ban ..................... H04L 69/40 |
| 2008/0154989 A1 | 6/2008 | Arman |
| 2009/0037517 A1 | 2/2009 | Frei |
| 2009/0164529 A1 | 6/2009 | McCain |
| 2010/0074147 A1 | 3/2010 | Decasper et al. |
| 2010/0274983 A1 | 10/2010 | Murphy |
| 2011/0004629 A1 | 1/2011 | Thorat et al. |
| 2011/0154014 A1 | 6/2011 | Thorn et al. |
| 2011/0161465 A1 | 6/2011 | Kowalski |
| 2011/0179415 A1 | 7/2011 | Donnellan et al. |
| 2012/0079221 A1 | 3/2012 | Sivasubramanian et al. |
| 2012/0124443 A1 | 5/2012 | Kwak |
| 2012/0159595 A1 | 6/2012 | Barham |
| 2012/0233417 A1* | 9/2012 | Kalach ................ G06F 11/1469 |
| | | 711/162 |
| 2013/0061089 A1 | 3/2013 | Valiyaparambil et al. |
| 2013/0074082 A1 | 3/2013 | Yu |
| 2013/0151414 A1 | 6/2013 | Zhu et al. |
| 2014/0019414 A1* | 1/2014 | Abraham ............ G06F 11/1469 |
| | | 707/640 |
| 2014/0082167 A1 | 3/2014 | Robinson et al. |
| 2014/0089266 A1 | 3/2014 | Une et al. |
| 2014/0173581 A1 | 6/2014 | Grinberg |
| 2014/0298490 A1 | 10/2014 | Clark et al. |
| 2014/0304830 A1 | 10/2014 | Gammon |
| 2014/0379660 A1 | 12/2014 | Vorsprach et al. |

OTHER PUBLICATIONS

Demchenko et al., "Access control infrastructure for on-demand provisioned virtualised infrastructure services," 2011 International Conference on Collaboration Technologies and Systems (CTS) Year: 2011 pp. 466-475.

Google English translation of Chinese Application CN101795206 (A)—Aug. 4, 2010.

* cited by examiner

PLUGGABLE RECOVERY IN A DATA PROTECTION SYSTEM

BACKGROUND OF THE INVENTION

1. The Field of the Invention

Embodiments of the present invention relate to backing up and restoring data. More particularly, embodiments of the invention relate to systems and methods for recovering data using a user interface with a pluggable framework.

2. The Relevant Technology

Computers have become ubiquitous in our society and many people interact with computers every day. People use computers to work on documents, spreadsheets, or presentations, create computer code, generate and maintain databases, send email, or the like. Computers are also used, for example, to conduct online activities such as shopping or surfing.

In each case, the user is interacting with data. The data is often important and it is advisable to protect the data for many reasons. Online booking agencies and associated businesses, for example, rely on up-to-date and accurate data in order to make reservations, monitor demand, or set pricing, to name a few.

Data can be protected by making a backup copy of the data. The backup copy is usually stored so that if something happens to the original data, the backup copy can be used for recovery purposes. Backup data can also be used for other reasons. For example, backup data enables data to be viewed as it existed at various times in the past.

The ability to backup and recovery is complicated by the way data is stored. Data may take the form of a file system, a database, or a server (e.g., an email server). One can appreciate that the recovery of these data is distinct. Recovering a database is different from recovering an email server or a file store. In addition, because software is typically operated on the host to which data is recovered, a user is typically required to log on to the host. These circumstances can complicate the recovery software and result in disparate user interfaces and in inconsistencies.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF THE PREFERRED EMBODIMENTS

Figure 1:
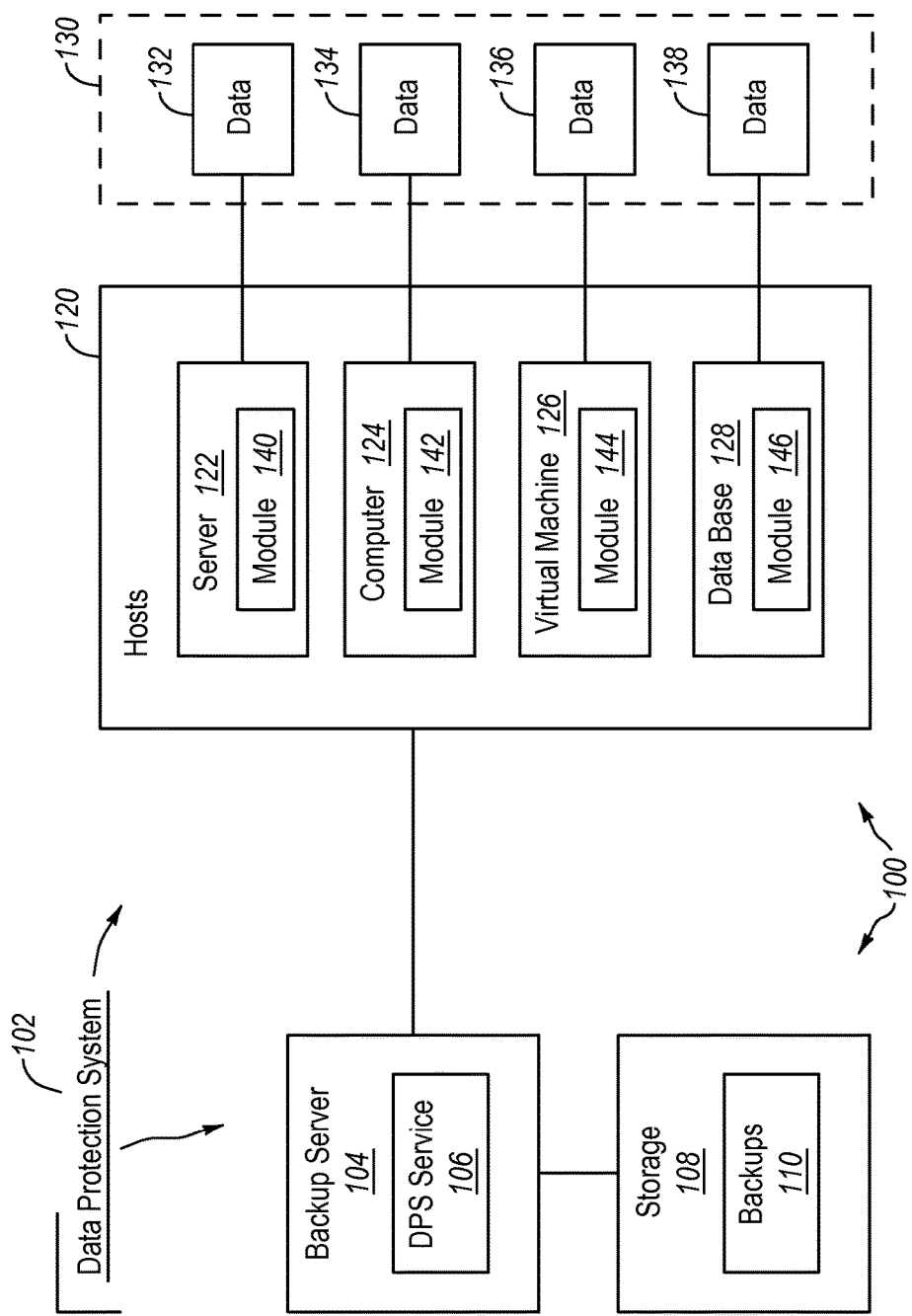
FIG. 1 illustrates an example of an environment that includes a data protection system configured to protect data.

Embodiments of the invention relate to systems and methods for protecting data. Embodiments of the invention relate a data protection system configured to protect data. Protecting data can include at least backing up the data and/or recovering the data. A recovery operation to recovery data can be independent of a backup operation to backup the data.

The data protection system can include various modules or components that can be installed on different devices. Some modules of the data protection system may operate on a server computer while other modules may operate on another device or computer (e.g., a host machine or host). In addition, the data protection operations discussed herein can be configured from another device.

The modules operating on the host and on the server cooperate to either backup or recover data. In some instances, embodiments of then invention enable a recovery operation to be configured and the actual recovery of the data is performed at a later time by the data protection system.

The recovery of data may be initiated through a user interface (UI) regardless of how the host is configured. In the context of recovering data, embodiments of the user interface may have some common aspects that are independent of the data and/or the host being recovered. Embodiments of the user interface may also include pluggable aspects.

More specifically, in order to adapt a recovery operation to the specific characteristics of the host, embodiments of the user interface may contain a pluggable framework where part of the interface can be supplied as a plug-in from outside of the user interface. When performing or when configuring a recovery operation, the appropriate plug-in is loaded into or made available to the user interface as needed. This enables the user interface to be adaptable and can enable the recovery operation to avoid problems associated with different versions, different operating systems, or the like. For example, the plug-in for a database may differ from the plug-in for a server or the plug-in for a virtual machine. As a result, the pluggable framework enables the same user interface to be adapted to the host, to the type of recovery being performed and to the data itself.

By decoupling the plug-in from the user interface, both the user interface and the plug-ins can be delivered to users on separate schedules. This benefits the provider of the data recovery system as well as the user of the data recovery system. This facilitates the release of new product, for example. In addition, the implementation of the user interface can allow the configuration of recovery operations to accommodate different versions of the data protection system, different operating systems, different software, and different environments. Without the plug-ins, the user interface becomes significantly more complex. Embodiments of the invention also enable the recovery operation or the configuration of the recovery operation to be run on a host to be run on another device that is remote from the host or to the device to which data is being restored.

FIG. 1 illustrates an example of an environment 100 that includes a data protection system 102 configured to protect data. Data can be protected by backing up the data and/or recovering or restoring the data and/or by configuring backup or recovery operations. The data protection system 102 in the environment 100 includes modules that are configured to backup data and/or recover data.

The environment 100 may be a network such as a local area network, a wide area network, or any other networked configuration. The environment 100 may include various devices including servers and other computers that are interconnected. The data stored in the system and/or the software operating the environment 100 may be cloud based, network based, or single computer based or combination thereof. The data protection system 102 or portions thereof may be implemented in a cloud or internet environment or other networked environment.

The data protection system 102 is implemented in the environment 100. The components or modules of the data protection system 102 can be installed on multiple devices. The data protection system 102 can include both server side components or modules and device or host side components or modules. The various modules cooperate protect data in the environment 100. The data protection system 102 can include hardware and/or software aspects.

The data protection system 102 may include, by way of example only, a backup server 104. A data protection system (DPS) service 106 may be operating on the backup server 104 or on another computer that coordinates with the backup server 104. The data protection system 102 may also include or be associated with storage 108. The storage 108 is configured to store backups 110, which are backups of data in the environment 100. The storage 108 may be networked storage, cloud based storage, disk arrays, tape media or the like or any combination thereof. The DPS service 106 may be web-enabled to enable remote access.

FIG. 1 further illustrates that the environment 100 includes hosts 120. The number of hosts 120 can vary and can be of different types. In one example, the hosts 120 are all part of the same network or associated with the same entity. The hosts 120 can include, by way of example only, servers 122 (e.g., a file server, an email server), computers 124 (e.g., desktop computers, laptop computers, tablet devices, smartphones), virtual machines 126, databases 128, or the like or any combination thereof. Each of the hosts 120 is often associated with its own data. The server 122 is associated with the data 132, the computer 124 is associated with the data 134, the virtual machines 126 have the data 136 (the storage for the virtual machines may an integral part of the virtual machines), and the database 128 is associated with the data 138.

Generally, the data 130 of the environment may be stored on a storage pool, on hard disk arrays, on networked storage or the like or any combination thereof. Alternatively, some of the storage for some of data 130 may be specific to a particular host. For instance, the data 138 of the database 128 may be resident on storage that is not available to other hosts. Other hosts may be similarly configured. More generally, however, the data 130 may be stored on multiple storage devices.

In the data protection system 102, the DPS service 106 cooperates with modules 140, 142, 144, and 146 to perform backup and/or recovery operations. When recovering the server 122, for example, the DPS service 106 coordinates with the module 140 to recover the data 132 or to recover a portion of the data 132.

Backup and/or recovery operations can be performed for each of the hosts 120 individually. The recovery of data for a particular host, however, may also impact another host. For example, if the server 122 is an email server and the data 132 corresponds to the mailboxes of multiple users, then recovery of the data 132 may have an impact on other hosts—for example the computers 124 associated with the users. In addition, data can be restored to a host that was not the host from which the data was backed up.

The backups 110 can include one or more backups of each of the hosts 120. Advantageously, the data of the hosts 120 can be recovered at different points of time. The backups 110 may include full backups, partial backups, snapshots, content addressed data, de-duplicated data, or the like or any combination thereof.

Figure 2:
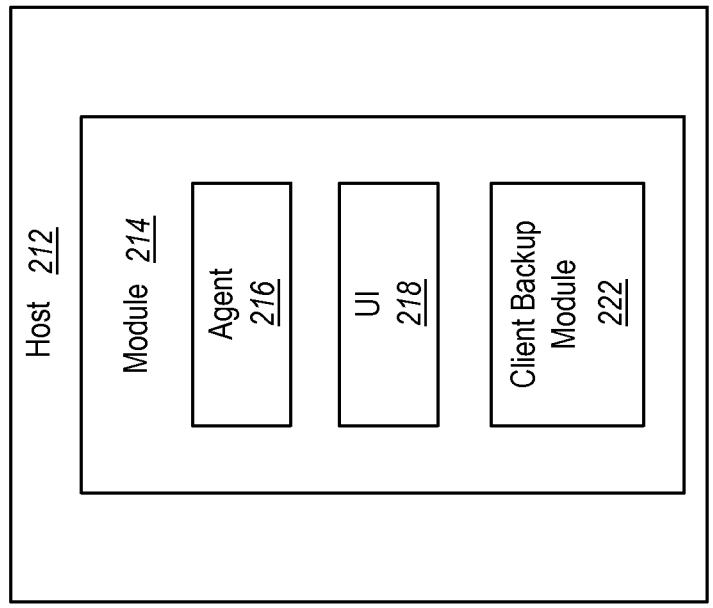
FIG. 2 illustrates an example of a backup server and a host in the context of a data protection system.
Figure 2:
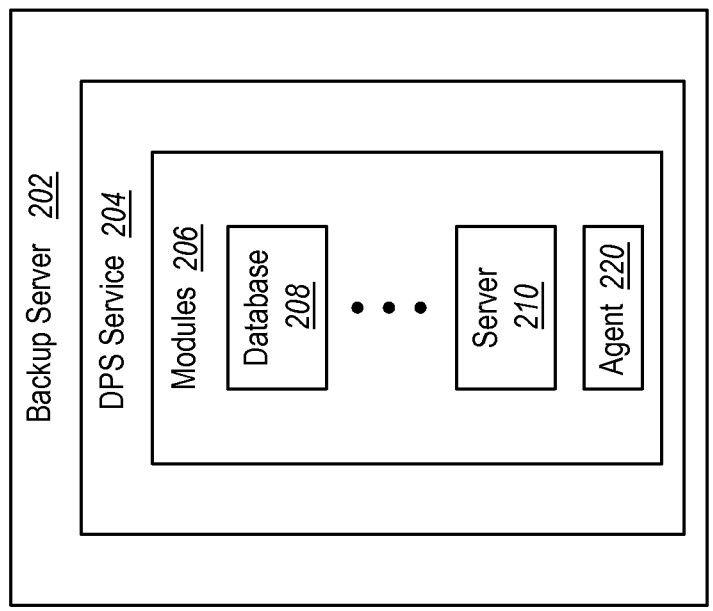

FIG. 2 illustrates an example of a backup server 202 and a host 212 in the context of a data protection system 200. The backup server 202 is an example of the backup server 104 and the host 212 is an example of one of the hosts 120. During a backup or recovery operation, the backup server 202 coordinates with the host 212. The configuration of a backup or recovery operation, however, may be performed from the host 212 or from another device.

The DPS service 204 coordinates with the module 214 to configure and/or perform the recovery or backup operation to protect data of the host 212. The module 214 on the host 212 includes a host agent 216 and a user interface 218 that participate, in some embodiments, in the recovery and/or backup operations.

The DPS service 204 may be web enabled. This allows a user to configure a recovery operation for the host 212 from another location or device. The user interface and plug in presented over the web interface may be the same as the user interface used at the host 212 for a recovery operation.

In one example, the user interface 218 is initiated (whether on the host 212 or on a remote device) and the host 212 is selected as the destination of the recovery operation. More specifically, the user interface 218 can be initiated on any host in the data protection system. The user interface 218, regardless of the host on which the user interface 218 is displayed, can communicate with the backup server 202 or the DPS service 204. The module 214 is then queried to determine which client backup module 222 has been installed on the host 212. A client backup module is part of the data protection software and is designed to protect the storage or data of a host in a particular way. For example, the client backup module may protect a native or attached file system storage in a particular way or may protect a running application such as a database or mail server in another way.

More than one client backup module may have been installed on the host 212. The user, through the user interface 218, selects the client backup module 222 for recovery. Upon selection of the client backup module 222, the remote agent 216 is initiated. The remote agent 216 implements an interface between the user interface 218 and retrieves one of the modules 206, which may be plug-ins. The DPS service 204 may keep modules for various versions of the module 214. For example, a database plug-in 208 and a server plug-in 210 are illustrated. Plug-ins for specific servers, databases, operating systems, and the like may be included in the modules 206.

The module 206 loaded into the user interface 218 can communicate with the remote agent 216 to perform any tasks necessary to configure the recovery operation. The recovery operation can then commence. Alternatively, the recovery operation may simply be scheduled and executed at a predetermined time.

Figure 3:
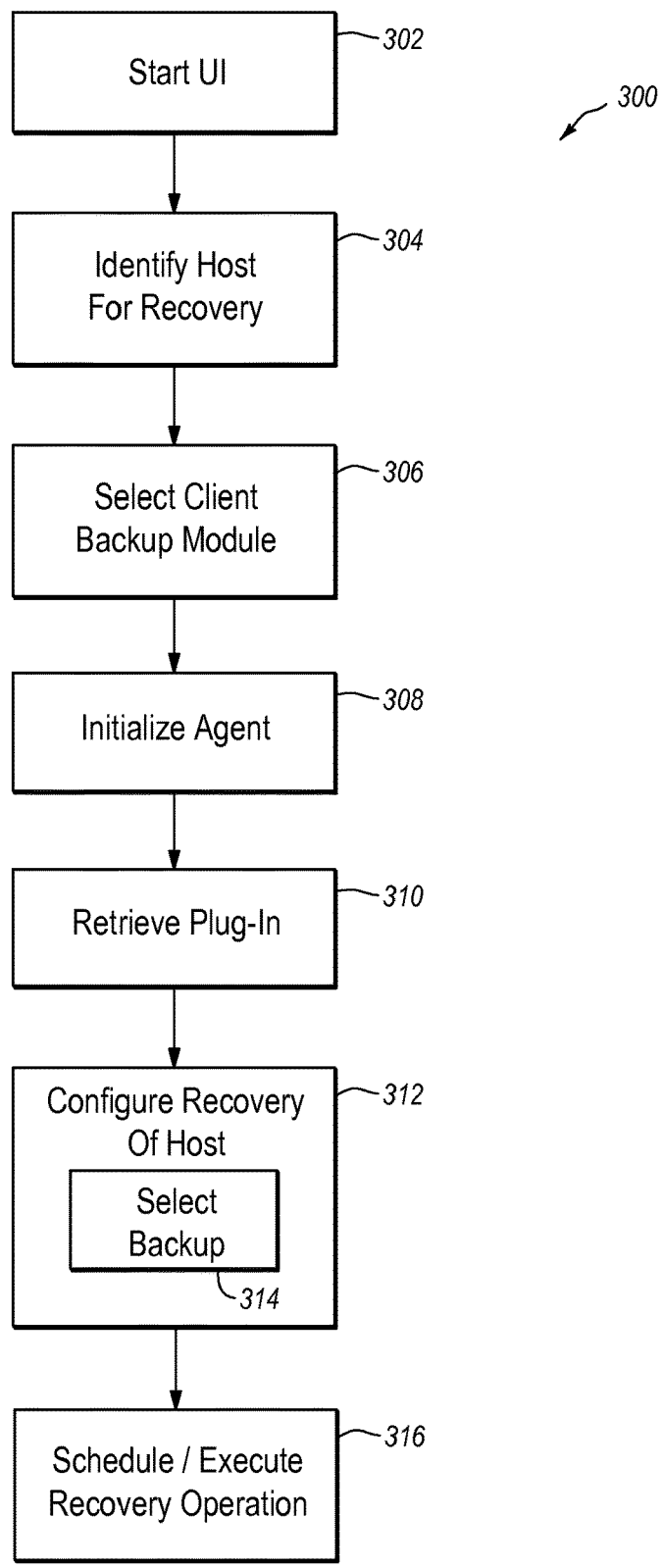
FIG. 3 illustrates a flow diagram of an example of a lifecycle of a recovery operation or of configuring a recovery operation.

FIG. 3 illustrates a flow diagram of an example of a lifecycle of a recovery operation or of configuring a recovery operation. A method 300 typically begins by initiating a user interface at box 302 on a device. The user interface may have aspects that are common to all hosts on which the user interface is initiated.

In box 304, a host is identified. The host may the same device on which the user interface is initiated or the identified host may be another device. The user interface may present information to the user that includes, but is not limited to, In box 306, a client backup module is selected through the user interface for recovery. This may include querying the host to determine which client backup modules have been installed on the host. For example, a host may have more than one backup module installed. A host may be backed up or recovered as a file system, as a database, as a mail server or the like. Each of these different configurations may be associated with a different client backup module. As a result, the user can select the appropriate client backup module in box 306.

In box 308, an agent is initialized on the host. The agent may be a remote agent, which includes recovery functionality in this example. The agent operating on the host may communicate with an agent on the backup server in order to retrieve a plug in in box 310 for the user interface. The plug-in allows the user interface to communicate with the agent on the backup server (e.g., the DPS service) in order to perform any tasks necessary to configure the host for the recovery operation. The recovery operation or the configuration thereof can proceed as a combination of interactions in the user interface and in the plug-in. Thus, the recovery operation of the host or of the host's data is configured in box 312.

Once the host is identified, a user may optionally identify a backup to recover in box 314. The backups may be presented in a manner that allows the user to browse the backups that are available. The user may identify the most recent data or a previous version of the host's data. Alternatively, the backup may be automatically selected by default. In box 316, the recovery operation may be scheduled for execution or executed.

Figure 4A:
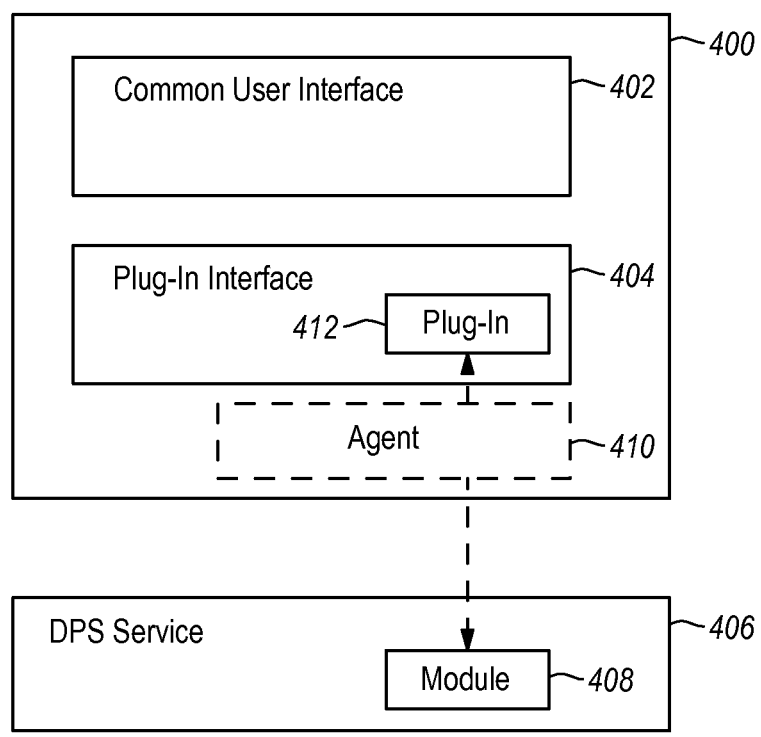
FIG. 4A illustrates a block diagram of a user interface for a recovery operation.

FIG. 4A illustrates a block diagram of a user interface for a recovery operation. FIG. 4A illustrates a user interface 400 that is presented to a user. The user interface 400 includes a common user interface 402. The common user interface 402 is a portion of the user interface 400 that may be the same for every type of host or data being recovered.

The user interface 400 also includes a plug-in interface 404. The plug-in interface 404 can display aspects of the recovery operation or configuration thereof that are associated with the host being recovered, the type of data being recovered, and the client backup module selected during the recovery operation configuration process.

A remote agent 410 can present an interface between the plug-in interface 412 or the plug in 412 and a module 408 on the DPS service 406. The aspects of the recovery operation configuration specific to the host being recovered may be presented using the plug-in 412 and displayed in the plug-in interface 404. The user can use both the common user interface 402 and the plug-in interface 404 to configure a recovery operation. The common user interface 402 and the plug-in interface may not be physically separated, but may be integrated.

Figure 4B:
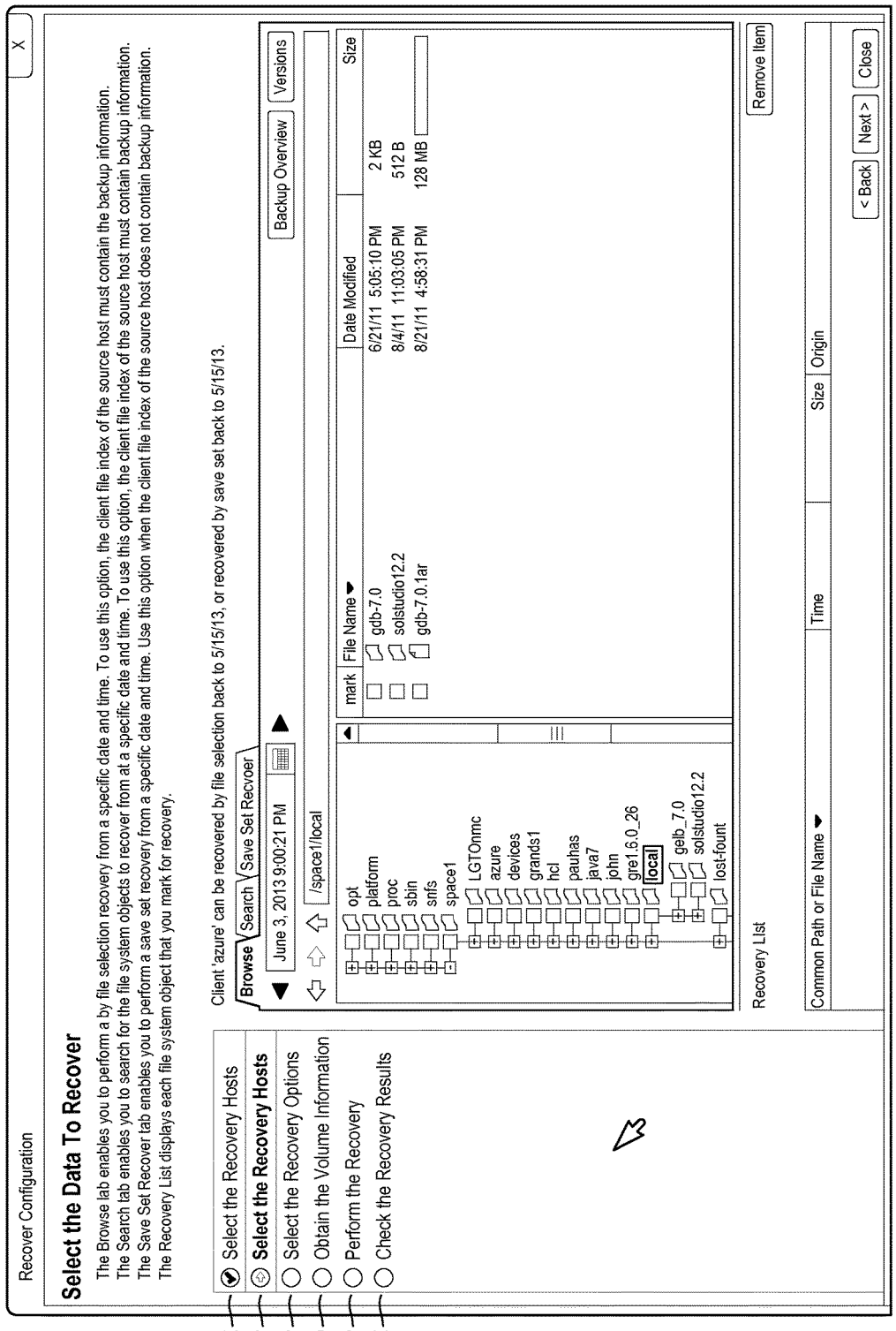
FIG. 4B illustrates a block diagram of a user interface for a file system recover.

FIG. 4B illustrates an example of a user interface for a file system recover. The user interface elements 452 in the user interface 450 includes the following steps, by way of example only. At 454, the recovery hosts are selected. In this example, a recovery operation could involve more than one host and may involve more than one backup. At 456, the data to recover is selected. At 458, the recovery options are selected. At 460, the volume information is obtained. At 462, the recovery is performed and at 464, the recovery results are checked. The elements 462 and 464 can be performed at a later time and can be distinct from configuring the recovery operation.

FIG. 4B illustrates another example of a user interface for a snapshot recover. The user interface 468 includes a user interface elements 470. At 472, the hosts are selected for recovery. At 474, a snapshot is selected. At 476, the snapshot is mounted. At 478, the data to recover is selected. At 480, the recovery options are selected. At 482, the recovery is performed and at 484, the recovery results are checked.

Figure 4C:
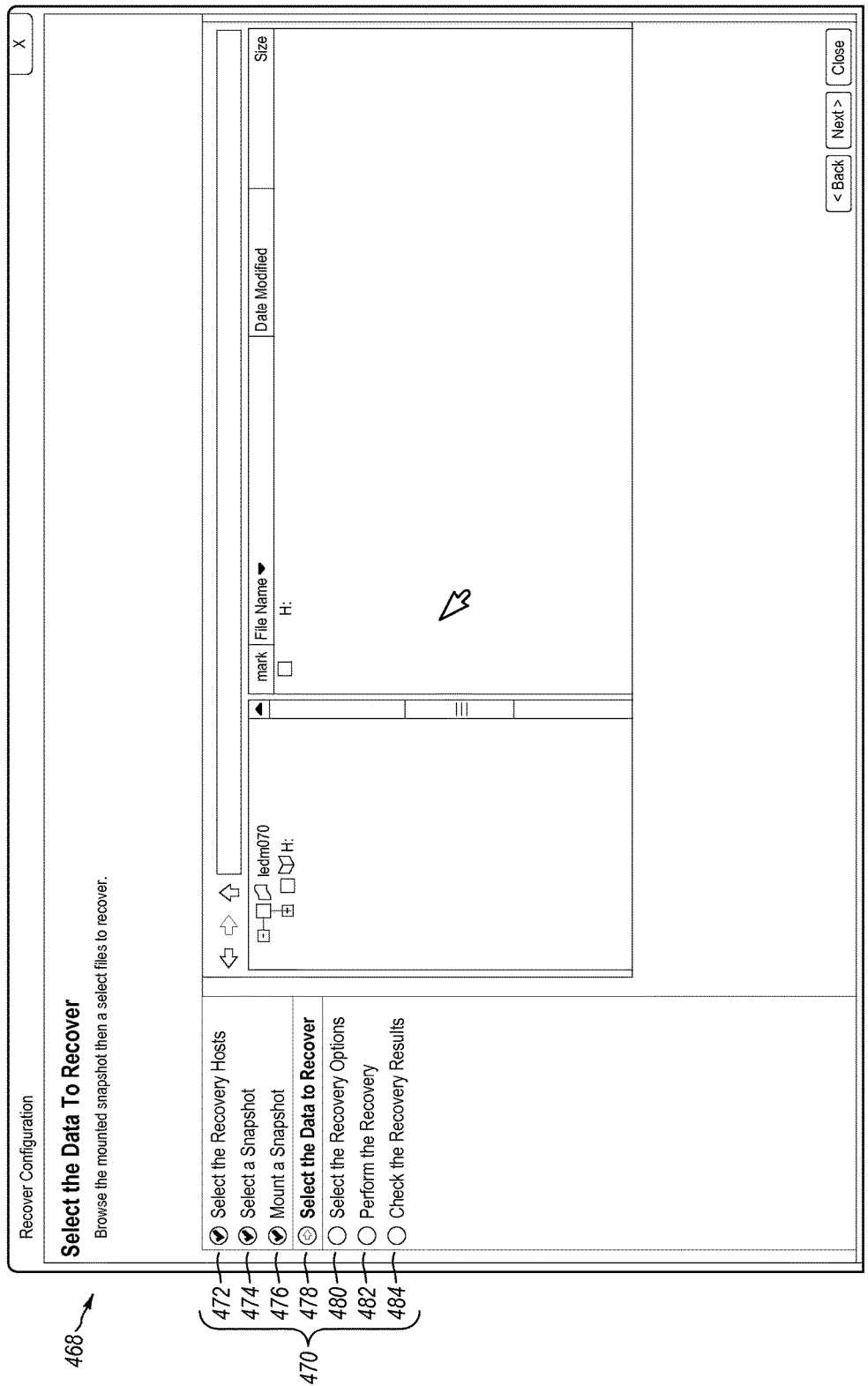
FIG. 4C illustrates a block diagram of a user interface for a snapshot recover.

FIGS. 4B and 4C illustrate an example of common user interface elements and user interface elements that are associated with a plug in as described herein. For example, some of the user interfaces elements are the same in both the user interface 450 and the user interface 468. By way of example only, elements 454 and 472, elements 454 and 478, elements 458 and 480, elements 462 and 482, and elements 464 and 484.

At the same time, some of the elements in the user interface 450 are not included in the user interface 468 and some of the elements in the user interface 468 are not included in the user interface 450. These elements are displayed according to the plug-in that has been loaded that is specific to the type of recovery operation being performed. For the snapshot recover in FIG. 4C, for example, it may be necessary to select a snapshot in element 474 and to mount a snapshot in element 476. For a filesystem recover in FIG. 4B, it may be necessary to obtain the volume information in element 460.

Using a plug-in, the workflow (e.g., the user interface elements 452 or 470) can be easily adapted to the circumstances of the recovery operation and adapt to the type of recovery operation, the software version on the host and/or the DPS service, or the like. In addition, all of the possible variations need not be directly built into the user interface, which, as previously discussed, can simply development of the user interface and simply distribution of the client backup module or of the data protection system as a whole to customers.

FIGS. 4A-4C further illustrate that the portions of the workflow associated with the common user interface and the portions of the workflow associated with the plug-in user interface can be mixed together. For a given recovery operation, the steps for one type of host or one type of data may require steps or elements that should be placed between some of the common elements. Preparing a host for a recovery operation or configuring a recovery operation thus includes preparing the user interface such that the workflow and the common and plug-in portions thereof are arranged in a particular order. In some embodiments, the order of some of the user interface elements in the workflow can be rearranged.

For example, the DPS system 102 can protect the data of a host through, by way of example, a series of periodic data protection events (e.g., snapshots or other backup). At some point in time, a request is made to recover at least a portion of the data. The user interface on the host (or on another device) is started and the host is selected for a recovery operation. If the host was a database, then the client backup module for a database is selected. As a result of this selection, database specific portions of the user interface can be loaded in the plug-in interface. As previously stated, workflows common to all recovery operations may be presented in the common user interface. The recovery of the data or of the database is then configured and scheduled in one example.

As previously stated, the user interface can share at the common components. This reduces both development time of the various components of the data protection system and reduces user learning curves since there is common functionality. Aspects of the recovery specific to certain data structures or formats can be implemented at the client backup module level, which reduces the burden on the implementation of the main user interface level.

Embodiments of the invention further relate to methods for preparing a host for a recovery operation, for example as illustrated at least in FIG. 3. Preparing the host can include at least one of configuring a recovery operation, scheduling the recovery operation, and/or performing the recovery operation. The actual implementation of a configured recovery operation can be time delayed. A user may schedule a recover that is performed when the system is experiencing less use (e.g., during the night).

Embodiments of the invention relate to a method for preparing a recovery operation to recover data on a host or on behalf of a host. Initially, a host is selected for the recovery operation. Once the host is selected, a user interface is displayed or presented. The user interface can include portions. One portion may be common to the user interface regardless of the host or regardless of the type of recovery operation being configured. Another portion may be specific to the host or to the type of recovery operation (e.g., a database, a server, a file system, etc.). When generating the user interface, a list of client backup modules may be displayed and one of the client backup modules is selected. The selection of a client backup module enables an agent operating on the host to retrieve a plug-in that is specific to the selected backup client module. Aspects of the user interface associated with the plug-in can then be displayed in the user interface. The common interface portion and the plug-in portion can be integrated together such that they are not distinguishable as portions in the user interface.

These portions cooperate to present a workflow in the user interface. By completing the workflow, the recovery operation can be configured and/or scheduled and/or performed.

A portion of the workflow may be the same for all workflows. For example, the selection of a host may be performed in each case. Other portions of the workflow may depend on the selected client backup module and are enabled by the plug-in that has been installed. For example, the restoration of a database, of a file server, of a mail server, or the like may each have details related to the recovery operation that are included in the workflow by the plug-in functionality.

The agent operating on the host can cooperate with the workflow to perform tasks related to the workflow. For example, as a user inputs information or makes selections in the workflow or in the user interface, the agent may perform tasks based on this information or selections.

The embodiments described herein may include the use of a special purpose or general-purpose computer including various computer hardware or software modules, as discussed in greater detail below. Embodiments of the invention relate to methods for protecting data, devices configured to protect data, and computer-readable media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for preparing a recovery operation to recover data, the method comprising:
   selecting a host device as a destination for the recovery operation;
   presenting a user interface that includes a first portion and a second portion;
   selecting a client backup module that has been installed on the host from the user interface and that was used to perform a backup operation;
   initiating an agent on the host device when the client backup module is selected;

retrieving, by the agent, a plug-in based on the selected client backup module from a service, wherein the plug-in is decoupled from the user interface and operates independently of the data being recovered, wherein the service maintains multiple plug-ins and multiple versions of the plug-ins, each version associated with a different version of the backup module, wherein the retrieved plug in is inserted into the second portion of the user interface; and configuring the recovery operation through a workflow presented in the first portion and the second portion of the user interface, wherein the plug-in adapts the second portion to characteristics of the recovery operation including a manner in which the selected client backup module performed a backup operation, wherein the first portion includes first elements of the recovery operation that are common to recovery operations for different hosts and wherein the second portion includes second elements of the recovery operation that are associated with the retrieved plug-in, ordering the first elements and the second elements in accordance with the recovery operation; and displaying the ordered first and second elements in the user interface.

2. The method of claim 1, wherein the host device selected for the recovery operation is different from a device displaying the user interface.

3. The method of claim 1, further comprising identifying a backup for the recovery operation.

4. The method of claim 1, wherein selecting a client backup module includes the agent querying the host to identify which client backup modules are available for the recovery operation.

5. The method of claim 1, wherein the workflow includes a first workflow for the first portion and a second workflow for the second portion of the user interface.

6. The method of claim 1, further comprising scheduling the recovery operation for execution.

7. The method of claim 1, further comprising retrieving the plug-in from the service operating on a backup server.

8. The method of claim 1, further comprising performing the recovery operation.

9. A non-transitory storage device having stored therein computer-executable instructions which, when executed by one or more hardware processors of a computing system, implement a method for a recovery operation for a host, the method comprising:

displaying a user interface on a device, wherein the user interface enables the recovery operation to be configured, wherein configuring the recovery operation includes:

selecting a client backup module associated with the host, wherein the client backup module was used in a backup operation of the host;

selecting a backup for the recovery operation;

initiating an agent when the client backup module is selected;

retrieving a plug-in associated with the selected client backup module from a data protection service that maintains multiple plug-ins and multiple versions for the selected plug-in, wherein the selected plug-in operates independently of the backup being recovered by the recovery operation; and presenting a workflow in the user interface to configure the recovery operation, wherein a first portion of the workflow common to multiple recovery operations and wherein a second portion of the workflow is facilitated by the plug-in, wherein completion of the workflow configures the recovery operation, wherein the plug-in adapts the second portion to characteristics of the recovery operation, wherein the first portion includes first elements of the recovery operation that are common to recovery operations for different hosts and wherein the second portion includes second elements of the recovery operation that are associated with the retrieved plug-in, ordering the first elements and the second elements in accordance with the recovery operation, wherein the ordered first and second elements are displayed in the user interface.

10. The non-transitory storage device of claim 9, wherein the method further comprising presenting a list of backups available for the recovery operation and receiving input selecting the backup.

11. The non-transitory storage device of claim 9, wherein the agent communicates with the plug-in to perform tasks in the workflow.

12. The non-transitory storage device of claim 9, wherein the method further comprises displaying client backup modules installed on the host device in the user interface, the client backup modules including the selected client backup module.

13. The non-transitory storage device of claim 11, wherein the method includes the coordinating with a second agent operating on a backup server to retrieve the plug-in and to recover the backup.

14. The non-transitory storage device of claim 11, wherein the method includes performing the recovery operation at a scheduled time.

15. A host device comprising:

non-transitory storage; and a processor;

a module that includes computer executable instruction that, when executed by the processor, configure a recovery operation, the module including:

an agent configured to retrieve a plug-in from a data protection service that maintains multiple plug-ins and multiple versions of the plug-in;

a user interface component; and a client backup module used in a backup operation;

wherein the user interface component is operable to generate a user interface that presents a workflow to a user on a display, wherein a portion of workflow is generated by the agent retrieving a version of the plug-in associated with the client backup module from the data protection service operating on a backup server, wherein the version of the plug-in selected is based on the client backup module that performed the backup operation and wherein the selected version of the plug-in operates independently of an application or data being recovered during the recovery operation, wherein the agent cooperates with the workflow presented in the user interface to perform tasks related to configuring the recovery operation, wherein the tasks are based on user input received through the user interface, wherein the plug-in adapts the portion of the workflow to characteristics of the recovery operation, wherein the portion of the workflow adapted by the plug-in inserts second elements into the workflow such that the second elements that are mixed in with first elements of the user interface in accordance with the recovery operation, and wherein the first elements are common to recovery operations for different hosts and the second elements are associated with the retrieved plug-in.

16. The host of claim 15, wherein the user interface component is operable to display a list of available backups, wherein one of the available backups is selected for the recovery operation.

17. The host of claim 16, wherein the agent cooperates with the data protection service to display the list of available backups.

18. The host of claim 17, wherein the user interface is displayed on a first device and a destination of the recovery operation is a second device.

19. The host of claim 15, wherein the user interface includes components that are common and independent of the client backup module.

20. The host of claim 15, wherein the host includes one of a server, a computer, a virtual machine or a database.

* * * * *